United States Patent [19]
Kage et al.

[11] Patent Number: 5,434,727
[45] Date of Patent: Jul. 18, 1995

[54] TAPE RECORDER HAVING A CASSETTE-SHUTTER OPENING MECHANISM

[75] Inventors: Shingo Kage, Koube; Yosikazu Yamano, Osaka; Yasunari Toyama, Osaka; Tetsuji Yoshii, Osaka, all of Japan

[73] Assignee: Matsushita Electric Industrial Co., Ltd., Osaka, Japan

[21] Appl. No.: 996,819

[22] Filed: Dec. 28, 1992

[30] Foreign Application Priority Data

Dec. 27, 1991 [JP] Japan ..................... 3-346005

[51] Int. Cl.$^6$ ................. G11B 15/675; G11B 5/008
[52] U.S. Cl. .................. 360/96.5; 360/96.6; 360/132
[58] Field of Search ............ 360/90, 93, 96.1, 96.5, 360/96.6, 99.02, 99.06, 99.07, 132, 133

[56] References Cited

U.S. PATENT DOCUMENTS

| | | | |
|---|---|---|---|
| 4,953,042 | 8/1990 | Yoshikawa | 360/96.5 |
| 5,161,079 | 11/1992 | Ohshima et al. | 360/132 |
| 5,172,284 | 12/1992 | Ohshima | 360/96.6 |
| 5,179,481 | 1/1993 | Kunze | 360/96.5 |
| 5,231,553 | 7/1993 | Weber et al. | 360/95.6 |

FOREIGN PATENT DOCUMENTS

| | | |
|---|---|---|
| 0317370 | 5/1989 | European Pat. Off. . |
| 0406943 | 1/1991 | |
| 0434143 | 6/1991 | European Pat. Off. . |
| 0438144 | 7/1991 | European Pat. Off. . |
| 0444623 | 9/1991 | European Pat. Off. . |
| 0498502 | 8/1992 | European Pat. Off. . |
| 3832672 | 3/1990 | Germany . |
| 4-1499848 | 5/1992 | Japan . |
| 4-2544950 | 9/1992 | Japan . |

*Primary Examiner*—John H. Wolff
*Assistant Examiner*—Jefferson Evans
*Attorney, Agent, or Firm*—Lowe, Price, LeBlanc & Becker

[57] ABSTRACT

A tape recorder includes a cassette holder for holding therein a tape cassette which is inserted in a direction parallel to the direction of movement of a slide shutter of the tape cassette, an arm-like shutter opening member for opening the slide shutter of the tape cassette, a slide member movable between a first position in which the tape cassette is latched on the slide member, and a second position in which the tape cassette is fully received in the cassette holder, and a control plate, connected with the slide member and engageable with the shutter opening member, for controlling the operation of an actuating pin of the shutter opening member such that when the slide member is disposed in the first position, the actuating pin is held on the outside of the cassette holder, and when the slide plate moves from the first position toward the second position, the actuating pin is able to move into the cassette holder and then engage and open the slide shutter of the tape cassette as the tape cassette is advanced by the slide member.

22 Claims, 11 Drawing Sheets

TAPE RECORDER HAVING A CASSETTE-SHUTTER OPENING MECHANISM

1. Field of the Invention

The present invention relates generally to a tape recorder for use with both a first tape cassette having a slide shutter which normally closes front openings into which a magnetic head and pinch rollers of the tape recorder are movable, and a second-tape cassette having a thick portion including similar front openings. More particularly, the invention is concerned with a tape recorder having a shutter opening mechanism for opening the slide shutter of the first tape cassette.

2. Description of the Prior Art

In recent years, digital audio equipment has become popular and, through technological development, a high quality digital-record and digital-playback tape recorder, generally called a digital audio tape recorder (DAT), has been proposed according to two methods. One method, known as R-DAT, uses a rotary head; the other method is a S-DAT which uses a stationary head. Since the S-DAT uses a stationary head, the head of the S-DAT and a tape cassette used with the S-DAT are structurally similar to those of a conventional analog method tape recorder. Because of this structural similarity, commercialization of a tape recorder which can record and/or playback both digital and analog signals is desirable.

A presently proposed tape recorder which is able to record and/or playback both digital and analog signals is used for both a conventional analog method compact cassette (hereinafter referred to as "ACC") and a digital method compact cassette (hereinafter referred to as "DCC"). The ACC includes a thick part having front openings into which a magnetic head and pinch rollers of the tape recorder project. The DCC has a slide shutter normally closing similar front openings. When the DCC is in use, the slide shutter is displaced in a direction parallel to the direction of advancement of a magnetic tape for opening and closing the front openings.

The proposed tape recorder includes a shutter opening means or mechanism for opening the slide shutter of the DCC when the DCC is loaded in the tape recorder. The shutter opening mechanism must be constructed so as to not obstruct movement of the ACC when the ACC is loaded. To this end, the shutter opening mechanism is provided with a shaft engageable with the slide shutter of the DCC for opening the slide shutter, and an engagement member engageable with a front edge of the ACC to force the shaft out of interference with the ACC. The shutter opening mechanism is complicated in construction. In addition, the shutter opening mechanism of the conventional tape recorder is only operable, during loading, when the DCC is inserted in the tape recorder in a direction perpendicular to the direction of movement of the slide shutter.

SUMMARY OF THE INVENTION

It is a general object of the present invention to provide a tape recorder which can be used with both an ACC and a DCC having a slide shutter movable in a direction parallel to the direction of insertion of the DCC relative to the tape recorder.

A more specific object of the present invention is to provide a tape recorder having a shutter opening mechanism which is capable of opening a slide shutter of a DCC which is movable in a direction parallel to the direction of insertion of the DCC relative to the tape recorder.

Another object of the invention is to provide a tape recorder having a shutter opening mechanism which is reliable in operation and highly resistant to shock and vibration.

A tape recorder according to the present invention is used with a tape cassette having a slide shutter movable in a direction parallel to the direction of insertion of the tape cassette relative to the tape recorder for opening and closing a front opening of the tape cassette into which a magnetic head of the tape recorder is movable.

The tape recorder comprises a cassette holder for holding therein the tape cassette while preventing the tape cassette from moving at least in a direction perpendicular to the direction of insertion of the tape cassette, and shutter opening means for opening the slide shutter of the tape cassette received in the cassette holder. The shutter opening means includes an actuating pin engageable with an end of the slide shutter, and means for urging the actuating pin into the cassette holder. A cassette transfer means is movable between a first position in which the tape cassette manually inserted in the cassette holder is latched on the transfer means, and a second position in which the tape cassette is fully received in the cassette holder and held in a condition ready for recording and/or playback of the tape cassette. The cassette transfer means is normally disposed in the first position. A control means is operatively connected with the cassette transfer means and engageable with the shutter opening means for controlling the operation of the actuating pin such that when the cassette transfer means is disposed in the first position, the actuating pin is held in a standby position located on the outside of the cassette holder against the force of the urging means. When the cassette transfer means moves from the first position toward the second position, the actuating pin moves into the cassette holder under the force of the urging means to engage and open the slide shutter of the tape cassette as the tap cassette is advanced by the cassette transfer means.

The tape recorder of the foregoing construction can be used with a second tape cassette including a thick part having an opening into which a magnetic head of the tape recorder is movable. When the second tap cassette is loaded in the tape recorder in the same direction as the tape cassette having the slide shutter, the actuating pin of the shutter opening means is held in contact with a front edge of the tape cassette and does not obstruct movement of the tape cassette.

Many other objects, advantages and features of the present invention will be better understood from the following description taken in conjunction with the accompanying drawings.

DETAILED DESCRIPTION OF THE INVENTION

Figure 1:
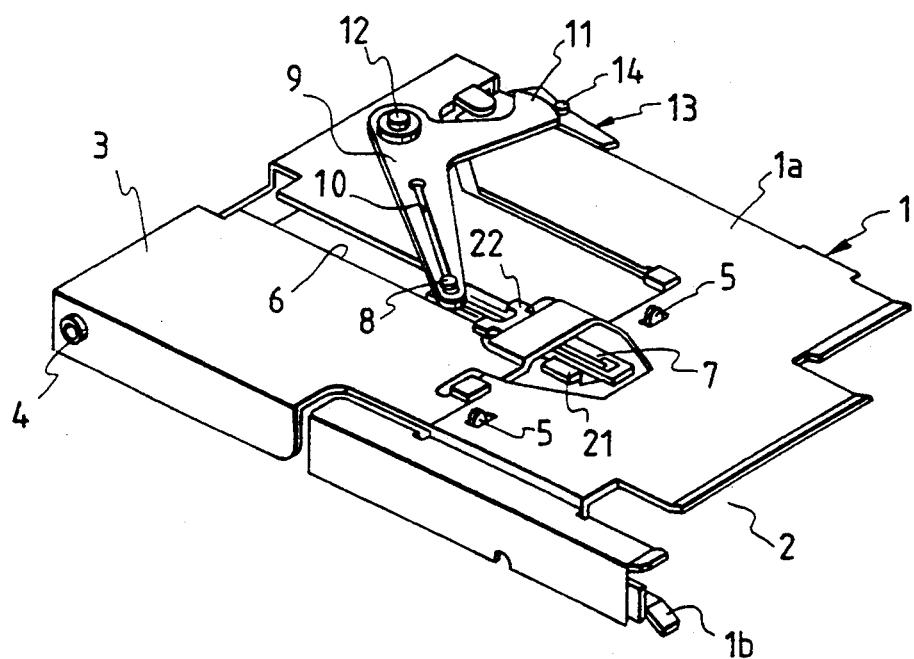
FIG. 1 is a perspective view of a main portion of a tape recorder according to a first embodiment of the present invention.

Certain preferred embodiments of the present invention will be described in greater detail with reference to the accompanying drawings, wherein like reference characters designate like or corresponding parts throughout the several views.

Figure 2:
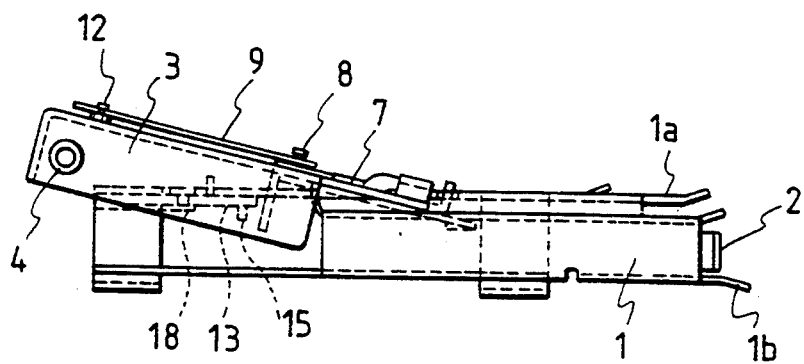
FIG. 2 is a front elevational view of the tape recorder with a cassette holder depicted in its lowered, loading position.

FIGS. 1 through 6 are illustrations of a tape recorder according to a first embodiment of the present invention. As depicted in .FIG. 1, the tape recorder includes a cassette holder 1 having a substantially box-like shape. The box-like cassette holder 1 has an opening 2 at one end (outer end) for receiving a tape cassette, and further includes an upper plate 1a and a lower plate 1b for respectively containing an upper surface and a lower surface of the tape cassette. A plate-like, cassette-holder shift member 3 has one end hinged as at 5 to the upper plate 1a of the cassette holder 1. The opposite end of the cassette-holder shift member 3 is pivotally connected by a pair of pins 4 (one shown) to a main chassis (not show in the tape recorder. The cassette-holder shift member 3 is pivotally movable about the pins 4 between a horizontal position (FIG. 1) and a downwardly tilted position (FIG. 2). The cassette-holder shift member 3, in the horizontal position, lies in substantially the same plane as the upper plate 1a so that it forms a part of the upper plate. Cassette-holder shift member 3 has an elongate guide hold 6 extending parallel to the direction of insertion of the tape cassette.

In the illustrated embodiment, the slide member 7 is slidably mounted in the guide hold 6 of the plate-like cassette-holder shift member 3, and movable along the guide hold 6 between a first position (FIG. 1) located at one end of the guide hold 6 disposed closer to opening 2 than the opposite end of the guide hold, and a second position located at the opposite end of the guide hole. Slide member 7 is normally disposed in the first position and has two locking prongs (described below) projecting into the cassette holder 1. These locking prongs are engageable with a particular portion (also described below) of the tape cassette to latch it on the slide member 7. When the slide member 7 is disposed in its first position, the tape cassette manually inserted in the cassette holder 1 is latched or locked in a receiving position by means of the locking prongs. When the slide member 7 moves from the first position to the second position, the tape cassette is transferred from the receiving position to a loading position in which the tape cassette is fully received in the cassette holder 1 and held in a condition ready for recording and/or playback. Thus, the slide member 7 constitutes a cassette transfer means which is movable for transferring the tape cassette from the receiving position to the loading position. In order to move the slide member 7, a drive means, such as a motor (not shown but identical to the motor 58 in FIG. 14) or a preloaded spring (not shown), is provided. The drive means is operatively connected with the slide member 7 via a suitable motion-transfer means such as a lever (not shown but identical to the lever 57 shown in FIG. 14). The slide member 7 has an upright pin 8 projecting from an upper surface of the slide member.

An L-shaped lever 9 is pivotally mounted on the cassette-holder shift member 3 with a pin 12. L-shaped lever 9 has an oblong hold 10 formed in one end of thereof to slidably receive the ping 8 of slide member 7. L-shaped lever 9 further includes a cam portion 11 formed at the opposite end thereof for engagement with a portion of a shutter opening means (described below) for controlling the operation of the shutter opening means in a manner described below. Thus, the L-shaped lever 9 is operatively connected with the cassette transfer means (namely, the slide member 7) and responsive to the movement of the cassette transfer means 7 for controlling the operation of the shutter opening means.

Figure 3:
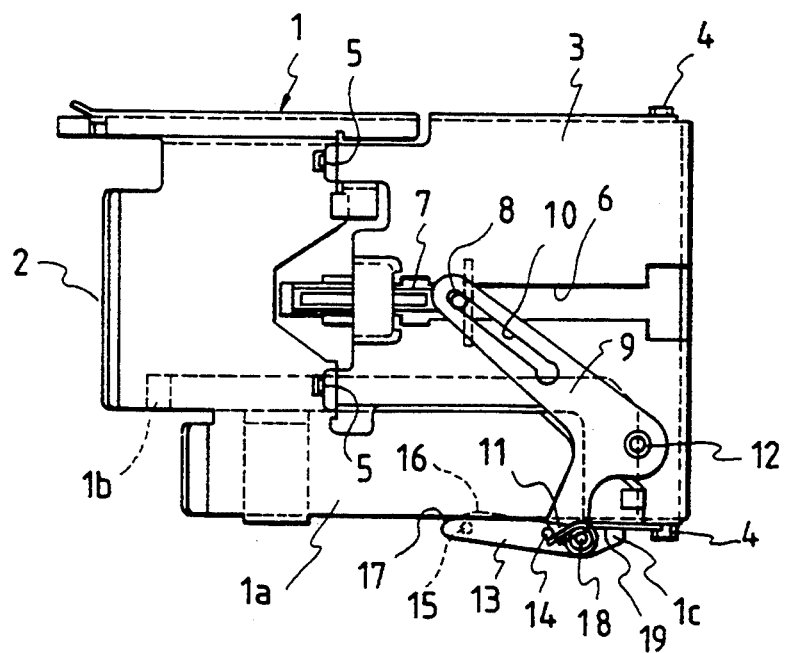
FIG. 3 is a plan view of the recorder and holder of FIG. 1.
Figure 4:
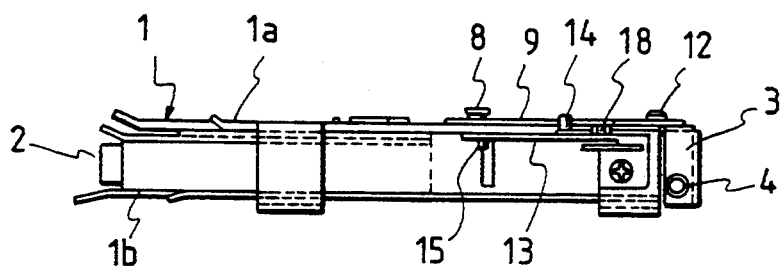
FIG. 4 is a front elevational view of the tape recorder with the cassette holder depicted in its upper horizontal, receiving position.

The shutter opening means comprises a flat, elongated plate-like arm 13 which is pivotally mounted on a support wing 1c (FIG. 3) projecting laterally outwardly from the cassette holder 1. A fixed pin 14 projects from an upper surface of arm 13 and is engageable with the cam portion 11 to pivot the ar about a pivot pin 18 so that the arm is pivoted to the support wing 1c, as depicted in FIGS. 2–4. An actuating pin 15 projects downwardly from a free end portion of the arm 13 and is engageable with an end of the slide shutter of a DCC for opening the slide shutter in a manner described below. The shutter opening means, namely, the arm 13, is movable together with the cassette holder 1 when the cassette holder moves vertically in response to pivotal movement of the cassette-holder shift member 3.

FIG. 2 depicts the tape recorder in a condition where cassette-holder shift member 3 is tilted down about pins 4 to lower the cassette holder from the position depicted in FIG. 1. In this condition, the tape cassette received within the cassette holder 1 is set in the loading position.

As depicted in FIG. 3, the free end portion of arm 13 includes an overlapping portion 16 and a sloped guide surface 17 extending continuously from the overlapping portion toward the free end of the ar. When arm 13 is in a standby position, that is, when cassette holder 1 is not occupied with a tape cassette as depicted in FIG. 3, the overlapping portion 16 is disposed within the cassette holder and extends immediately below the upper plate la of the cassette holder. This arrangement insures that the overlapping portion 16 overlies an upper surface of the DCC received within the cassette holder 1. The sloped guide surface 17 flares toward the opening 2 of the cassette holder 1. The arm 13 is urged in the clockwise direction in FIG. 3 by means of a torsion coil spring 19. Thus, the actuating pin 15 of the ar 13 is normally urged toward an internal space of the cassette holder 1 by the torsion coil spring 19.

Figure 5:
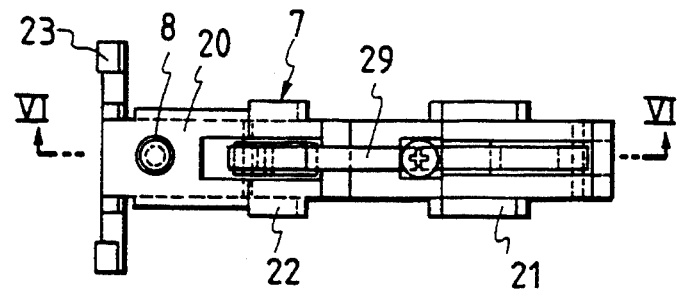
FIG. 5 is an enlarged plan view of a cassette transfer mechanism of the tape recorder.
Figure 6:
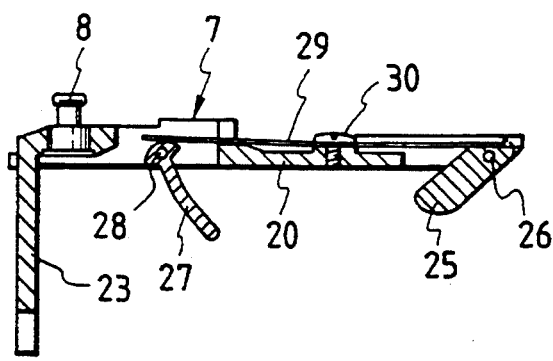
FIG. 6 is a cross-sectional view taken along line VI—VI of FIG. 5.

Slide member 7 includes, as best depicted in FIGS. 5 and 6, an elongated body 20 slidably received in guide hold 6 (FIG. 1) of cassette-holder shift member 3, a laterally projecting first guide wing 21 (FIG. 5) disposed below the upper plate la for limiting an upward movement of the slide member 7, a laterally projecting second guide wing 22 (FIG. 5) disposed above the upper plate la for limiting a downward movement of the slide member 7, and an abutment plate 23 extending downwardly from an end of the body 20 for retaining a forward end of the tape cassette inserted in the cassette holder 1. The abutment plate 23 also serves as a pusher plate which forces the tape cassette out from the cassette holder 1 when the eject mode of the tape recorder is selected. As depicted in FIG. 6, the slide member 7 further includes a first locking prong 25 pivotally connected by a pin 26 to an end of the body 20 remote from the abutment plate 23, and a second locking prong 27 pivotally connected by a pin 28 to the body at a portion adjacent the abutment plate. The first and second locking prongs 25 and 27 project into cassette holder 1 and are normally urged by a plate spring 29 to assume their original, tilted positions (FIG. 6). Plate spring 29 is fastened to the body 20 by means of a screw 30. The first locking prong 25 is used to latch an ACC on th slide member 7, while the second locking prong 27 is used to latch a DCC 31 on the slide member 7.

Figure 7:
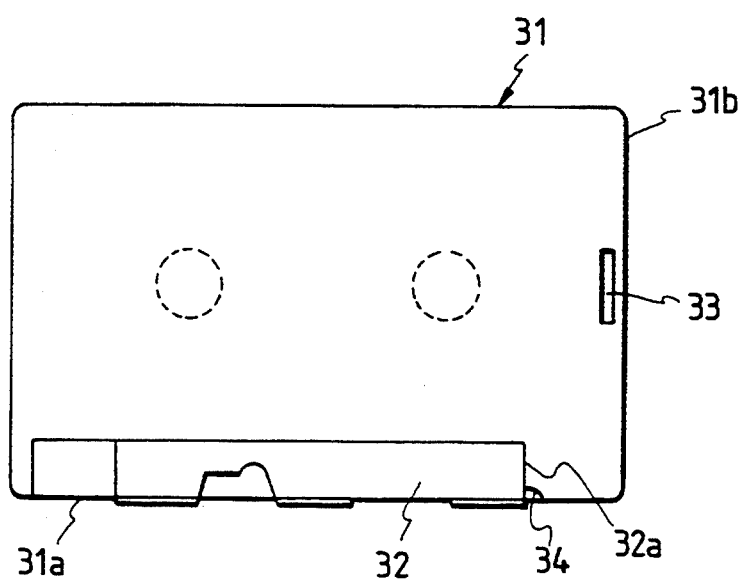
FIG. 7 is a plan view depicting a DCC tape cassette having a slide shutter.
Figure 8:
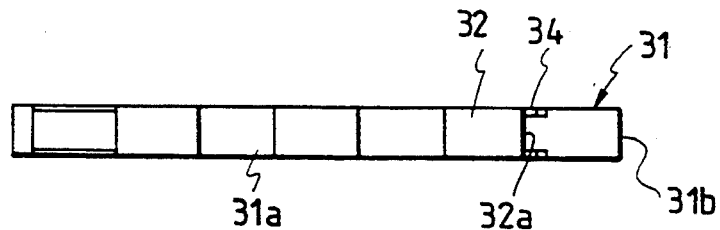
FIG. 8 is a front elevational view of the cassette of FIG. 7.
Figure 9:
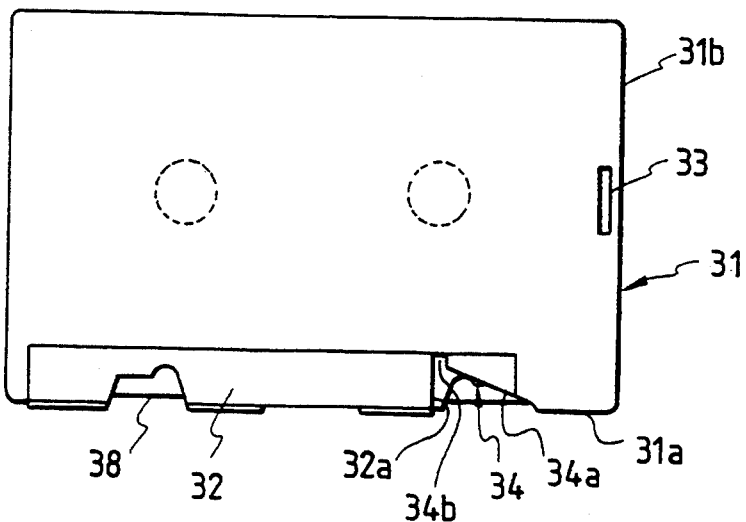
FIG. 9 is a view similar to FIG. 7, but depicting the slide shutter in an open position.
Figure 10:
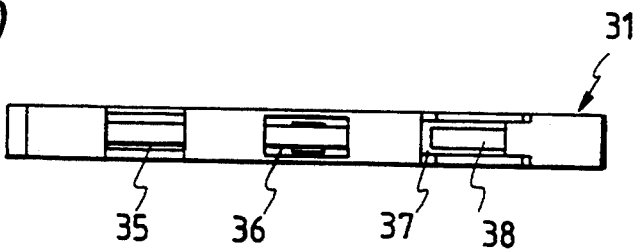
FIG. 10 is a front elevational view of the shutter of FIG. 9.

As depicted in FIG. 7, the DCC 31 includes a slide shutter 32 slidably mounted on one longitudinally edge (front edge) 31a of the DCC for opening and closing front openings 35-37 (FIG. 10) in which a magnetic head and a pair of ping rollers (none shown) are movable. Reference numeral 38 denotes magnetic recording tape. The slide shutter 32 is normally disposed in a closed position (FIGS. 7 and 8). The DCC 31 further has a locking recess or groove 33 (FIGS. 7 and 9) formed in an upper surface (labeling surface) of the DCC at a position near one end (forward end) 31b thereof. Locking recess 33 is snap-engaged with the locking prong 27 (FIG. 6) to latch the DCC 31 on the slide member 7 when the DCC is inserted into the cassette holder 1. The DCC 31 also has a cutout recess 34 formed in front edge 31a for receiving therein the actuating pin 15 (FIG. 15) of the shutter opening means. When the slide shutter 32 is disposed in the closed position (FIG. 7), the cutout recess 34 is partly closed by the slide shutter 32. The cutout recess 34 is fully opened when the slide shutter 32 is disposed in an open position (FIG. 9).

Figure 11:
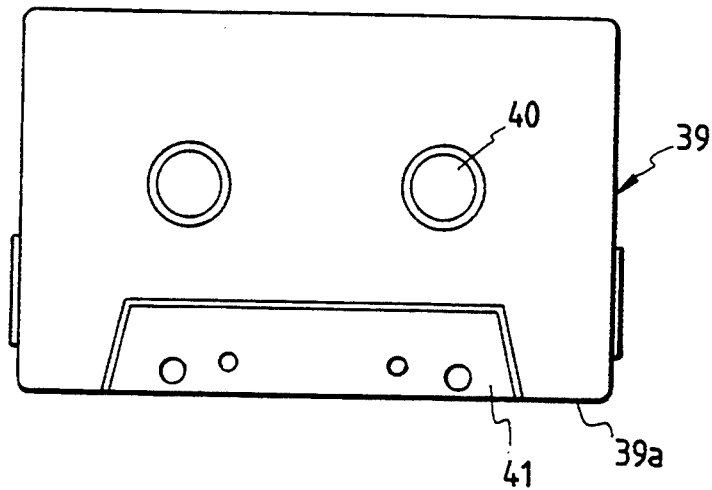
FIG. 11 is a plan view of an ACC.
Figure 12:
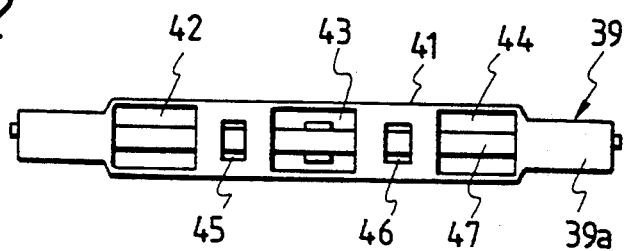
FIG. 12 is a front elevational view of the ACC of FIG. 11.

The ACC 39 includes, as best depicted in FIG. 11, a hollow reel hub 40 in which the locking prong 25 (FIG. 6) snaps to latch ACC on the slide member 7, and a thick part 41 extending along one longitudinal edge (front edge) 39a of the ACC. Thick part 41 has front openings 42-46 (FIG. 12) into which a magnetic head and a pair of pinch rollers (none being shown) are movable. Reference numeral 47 denotes a magnetic recording tape. Due to the presence of the thick part 41, the ACC 39 is thicker than the DCC 31. The thickness of ACC 39 excluding the thick part 41 is the same as the maximum thickness of DCC 31.

L-shaped lever 9 is operatively connected with slide member 7 and engageable with arm 13 for controlling the operation of the arm such that when the slide member is disposed in the first position (FIGS. 1 and 3), the actuating pin 15 of the arm is held in a standby position located on the outside of the cassette holder 1. When the slide member 7 moves from the first position toward the second position, the actuating pin 15 is able to move into the cassette holder 1 and then engage and open the slide shutter 32 of the DCC 31 as the DCC is advanced by the slide member. Preferably, the shape and configuration of the L-shaped lever 9 and cam portion 11 is determined such that when the forward end 31b of the DCC 31 passes by the actuating pin 15 of the arm 13, the actuating pin is disposed on the outside of the cassette holder 1, and before the cutout recess 34 of the DCC reacts a position of the actuating pin 15, the arm 13 starts turning in the clockwise direction (FIG. 3) under the force of the spring 19 so that the actuating pin 15 is brought into contact with the front edge 31a of the DCC. This will ensure that as soon as the cutout recess 34 arrives at the position of the actuating pin 15, the actuating pin is able to slide along a sloped guide surface 34a (FIG. 9) to the cutout recess 34 and subsequently engage the forward end 32a of the slide shutter 32. With this engagement, a further advancing movement of the slide shutter 32 is blocked while a body of the DCC 31 continues its advancing movement. As a result, the slide shutter 32 is progressively opened by the actuating pin 15 as the body of DCC 31 advances.

The tape recorder of the foregoing construction operates as follows:

A DCC 31 depicted in FIG. 7 is manually forced from the opening 2 into the cassette holder 1 in FIG. 1. In this instance, the user holds the DCC 31 so that the labeling surface faces upwards and the slide shutter 32 faces to the right. As the DCC advances, forward end 31b of the DCC first engages the first locking prong 25 (FIG. 5), then forces the first locking prong to turn clockwise against the force of the plate spring 29, and thereafter passes below the first locking prong. A further advancing movement of the DCC 31 causes the forward end 31b to first engage the second locking prong 27 (FIG. 6), then turn the second locking prong clockwise in FIG. 6 against the force of the plate spring 29, and thereafter passes below the second locking prong. As the DCC 31 further advances, the second locking prong 27 snaps into the locking recess 33 whereupon the DCC is latched on the slide member 7. The latched DCC 31 is now disposed in the receiving position. In this instance, manual advancing movement of the DCC 31 is stopped.

Figure 13:
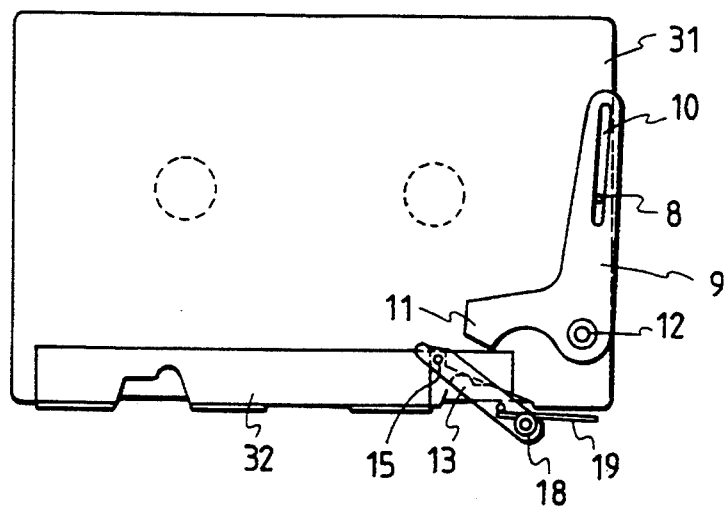
FIG. 13 is a schematic plan view depicting the shutter of a DCC being opened by a shutter opening mechanism of the tape recorder.

When the DCC 31 arrives at this receiving position, this is detected by a suitable detecting means, such as a sensor (not shown), which activates the non-illustrated drive means. The drive means moves the slide member 7 from the first position depicted in FIG. 1 toward the second position so that the DCC 31 is fully received in cassette holder 1. And, the cassette-holder shift member 3 is tilted downwardly to lower the cassette holder 1. The DCC 31 is thus transferred from the receiving position to the loading position. During that time, the forward end 31b of the DCC 31 passes by the actuating pin 15 of the ar 13 while the actuating pin is disposed outside the cassette holder 1. Then, before the cutout recess 34 of the DCC 31 reaches a position of the actuating pin 15, the arm 13 turns clockwise in FIG. 3 under the force of the spring 19 so that the actuating pin is urged into contact with the front edge 31 a of the DCC. This will ensure that when the cutout recess 34 reaches the position of the actuating pin 15, the actuating pin moves into contact with the sloped guide surface 34a (FIG. 9) of the cutout recess. As the DCC 31 advances, the actuating pin 15 slides along the sloped guide surface 34a and subsequently is brought into abutment with the forward end 32a of the slide shutter 32. In this instance, since a further advancing movement of the slide shutter 32 is blocked by the actuating pin 15, only a body of the DCC 31 moves into the cassette holder 1. As a result, the slide shutter 32 is progressively opened by the actuating pin 15 as the DCC 31 advances. When the DCC 31 is fully received in a locking groove 34b (FIG. 9) of the cutout recess 34 (FIG. 13). In this condition, the slide shutter 32 is fully opened.

As depicted in FIGS. 3 and 13, the pivot axis of the arm 13, namely, the center of the pin 18, is disposed on the outside of the right side edge of the cassette holder 1. In addition, the free end of the arm 13 is directed toward the opening 2 of the cassette holder, and the actuating ping 15 is disposed on the free end of the ar. with arm 13 thus arranged, once engagement between the forward end 32a of the slide shutter 32 and the actuating pin 15 occurs, a further advancing movement of the DCC 31 enables the slide shutter 32 to produce a force tending to turn the actuating pin in the clockwise direction. With the force thus produced, it is possible to use a torsion coil spring 19 having a relatively small spring force. In addition, the L-shaped lever 9 oscillates in accurate synchronism with reciprocating movement of the slide member 7 driven by the drive means. It is, therefore, possible to omit the use of a return spring associated with the L-shaped lever 31. Since the position of the L-shaped lever 9 is controlled accurately, the position of the arm 13 is also accurately controlled. Thus, arm 13 is able to operate reliably without causing a timing error.

As depicted in FIGS. 1, 2 and 4, the upper plate 1a of cassette holder 1 is stepped such that a portion of the internal space of the cassette holder which is adapted to receive at least the thick part 41 of ACC 39 has a thickness (or an extent in the direction of height of the cassette holder) slightly larger than the maximum thickness of the ACC, and the remaining portion of the internal space has a thickness slightly larger than the maximum thickness of the DCC. Accordingly, when the DCC 31 is inserted in cassette holder 1, there is produced a space between an upper surface of the DCC and a lower surface of the first-mentioned portion of the upper plate 1a. The arm 13 has a thickness smaller than the thickness of the space thus produced. The arrangement of the arm 13 is determined such that the arm is pivotally movable in this space without interference with the DCC and the upper plate 1a. When the arm 13 is disposed in the standby position (FIG. 3), the overlapping portion 16 of the arm projects into the cassette holder 1 and underlies the lower surface of the upper plate 1a. Accordingly, when the DCC 31 is inserted into the cassette holder 1, the overlapping portion 16 overlies the upper surface of the DCC. The overlapping portion 16 is thus guided between the DCC 31 and the upper plate 1a sot hat the arm 13 is held in the same plane throughout the shutter opening operation. Accordingly, the shutter opening operation of the arm 13 is achieved stably and reliably.

When the ACC 39 (FIGS. 11 and 12) it to be loaded in the tape recorder depicted in FIG. 1, the ACC is manually forced from the opening 2 into the cassette holder 1, with the thick part 41 facing to the right. Forward movement of the ACC 39 is continued until the first locking prong 25 (FIG. 6) snaps into the hollow reel hub 40 of the ACC. ACC 39 is thus latched on the slide member 7. The drive means (not shown) is then activated to move the slide member 7 in the same direction as the direction of insertion of ACC 29 until slide member arrives at the second position in which the ACC is fully received in the cassette holder 1. With this movement of slide member 7, L-shaped lever 9 turns clockwise in FIG. 3 about the pin 12 whereupon the cam portion 11 of the L-shaped lever is disengaged from the pin 14 of the arm 13. Arm 13 is now allowed to turn in the clockwise direction about the pin 18 under the force of torsion coil spring 19. In this instance, however, since the front edge 39a of ACC 39 does not have a cutout recess receptive of the actuating pin 15, the pivotal movement of the arm 13 is stopped when the actuating pin engages the front edge 39a of the ACC. As the ACC 39 advances, the thick part 41 comes to the position of the actuating pin 15. In this instance, since the overlapping portion 16 projects more deeply into the cassette holder 1 than the actuating pin, the front edge 39a of the ACC 39 is brought into engagement with the overlapping portion and the actuating pin is spaced from the front edge. The guide surface 17 formed at the free end of the arm 13 serves to smoothen the advancing movement of the ACC 39 at the transition between an engagement between the front edge 39a and the actuating pin 15 and an engagement between the front edge and the overlapping portion 16. Thus, the tape recorder having the slide-shutter opening mechanism described above can be used with both DCC 31 and ACC 39.

FIGS. 14 through 18 are illustrations of a second embodiment of the invention which has three significant differences from the first embodiment previously described.

A first difference between the tape recorder of FIGS. 14–18 and the first embodiment is that the control means is composed of an elongate control plate 50 projecting laterally from the slide member 7. The control plate 50 in the illustrated embodiment is in the form of a cranked sweptback wing. The control plate 50 has a fixed end integral with the slide member 7 and a free end formed with a cam portion 51 engageable with a free end portion of the flat, elongated arm (shutter opening means) 13. The cam portion 51 is composed of a straight guide surface extending parallel to the guide hole 6 of the plate-like cassette-holder shift member 3. The control plate 50 further has a sloped guide surface 52 extending continuously from the straight guide surface 51 toward the fixed end and facing toward the opening 2 of the cassette holder 1. The control plate 50 is composed of an inner portion 50a and an outer portion 50b which extends in two different planes. The inner portion 50a of the control plate 50 underlies the plate-like cassette-holder shift member 3, and the outer portion 50b of the control plate 50 extends in a plane located abvoe a plane of the plate-like cassette-holder shift member 3 is disposed in a horizontal position (FIG. 16), the outer portion 50b of control plate 50 extends over the upper plate 1a of cassette holder 1. Control plate 50 further includes a guide fin 53 projecting from an end of the inner portion 50a adjacent the outer portion 50b and extending in the same plane as the inner portion. The guide fin 53 and the outer portion 50b of the control plate 50 jointly hold therebetween a guide edge 54 of the upper plate 1a as the control plate moves together with the slide member 7. The guide edge 54 extends in a direction parallel to the direction of insertion of the tape cassette. The length of the guide edge 54 and the position of the guide fin 53 are determined such that the guide fin and the control plate 50 are able to continuously hold the guide edge as long as the engagement between the control plate 50 and the arm 13 continues, and the guide fin and control plate release the guide edge before the slide member 7 arrives at its second position.

A second difference in the embodiment of FIGS. 14–18 is that the arm 13 is movable in a plane immediately above upper plate 1a. The free end of the flat, elongated arm 13 is rounded for form a circular flange 55 which is concentric to the actuating pin 15 and engageable with the straight guide surface 51 and the sloped guide surface 52 of control plate 50. When the circular flange 55 is held in contact with the straight surface 51 of the control plate 50, the actuating pin 15 is disposed outside the cassette holder 1. When the circular flange 55 moves from the straight guide surface 51 to the sloped guide surface 52, the arm 13 turns clockwise under the force of the spring 19, so that the actuating pin 15 projects into the cassette holder 1. When the arm 13 is in the standby position (FIGS. 14 and 16), the circular flange 55 lies over the upper plate 1a of cassette holder 1.

A third difference in the embodiment of FIGS. 14–18 is that the upper plate 1a of the cassette holder 1 has a cutout guide recess 56 (FIGS. 17 and 18) receptive of the actuating pin 15 for the guiding motion of the actuating pin when arm 13 pivots in the clockwise direction. The cutout guide recess 56 has an arcuate guide edge 56a slidably engageable with an outer surface of the actuating pin 15. When arm 15 is disposed in the same standby position, actuating pin 15 is held in contact with the arcuate guide edge 56a of cutout guide recess 56.

Figure 14:
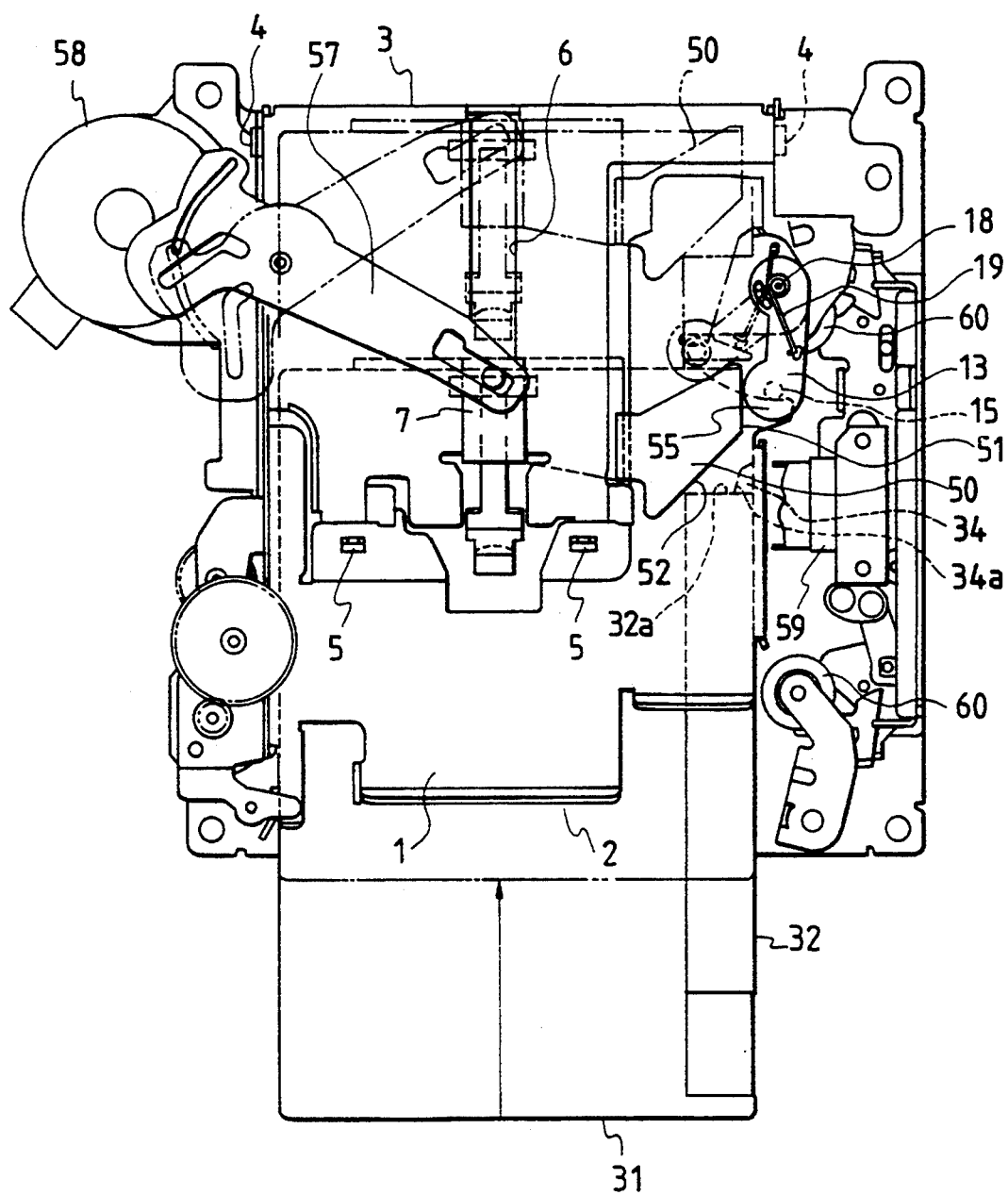
FIG. 14 is a plan view of a tape recorder according to a second embodiment of the present invention, the view depicting the tape recorder used with a DCC.
Figure 16:
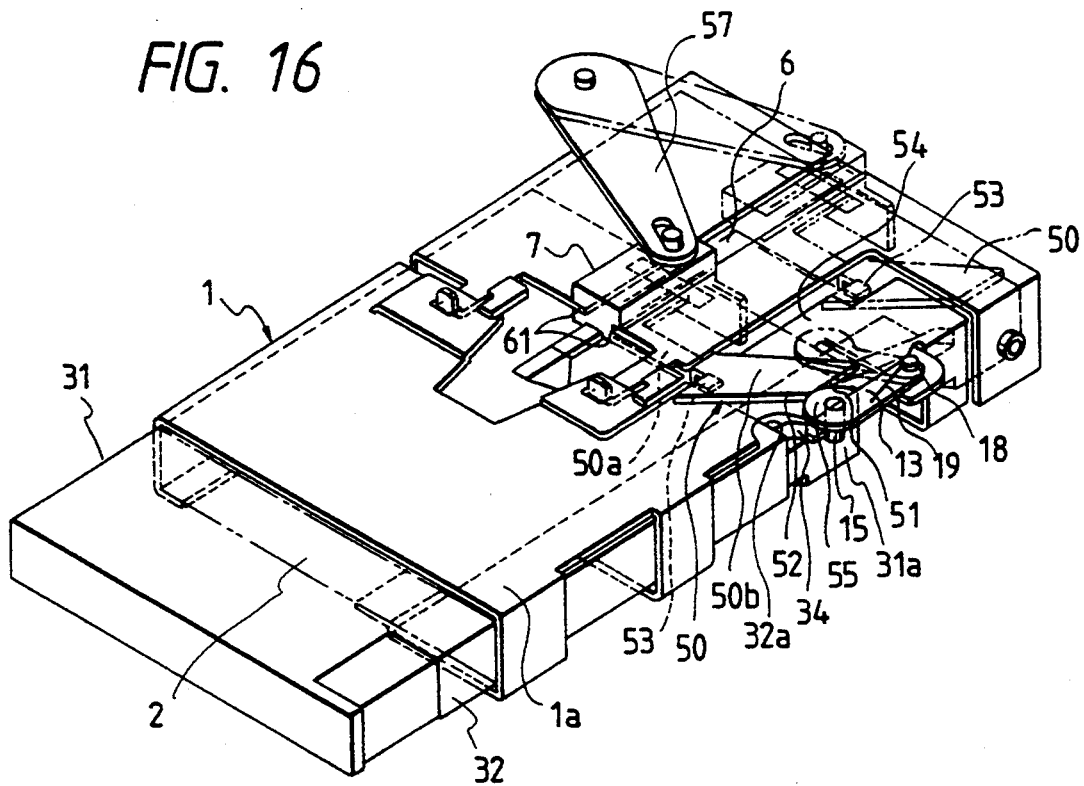
FIG. 16 is a perspective view, with parts cutaway for clarity, of the tape recorder in FIG. 14, the view depicting a cassette holder in an upper horizontal, receiving position.
Figure 17:
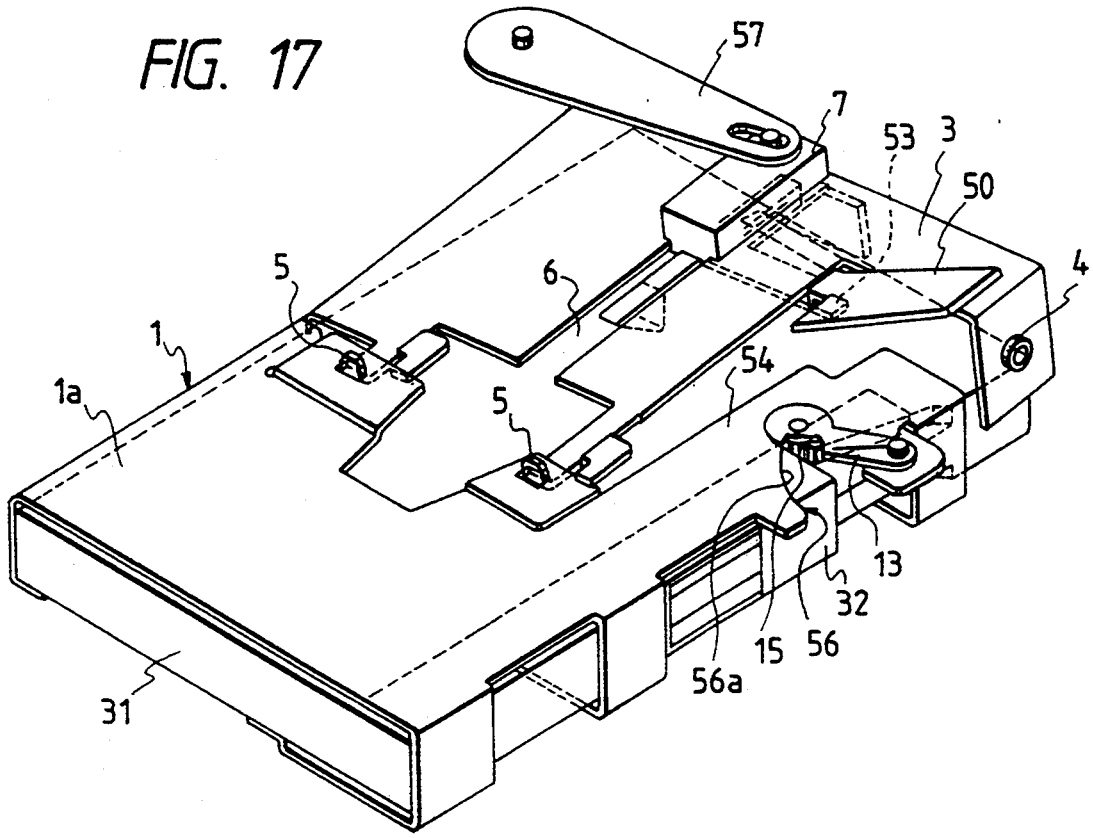
FIG. 17 is a view similar to FIG. 16, but depicting the cassette holder in its lowered, loading position.

In FIG. 14, reference numeral 57 denotes a lever for reciprocating the slide member 7 between the first position indicated by the solid lines and the second position indicated by the phantom lines. A motor 58 oscillates lever 57 to reciprocate the slide member 7. A magnetic head 59 projects into the tape cassette (DCC) 31 when the slide shutter 32 is open. Pinch rollers 60 project into tape cassette 31 when the slide shutter 32 is open. Slide member 7, depicted in FIG. 16, has two guide grooves 61, 61 formed in opposite side surfaces thereof and slidably fitted with opposite longitudinal edges of the guide hole 6. Upper plate 1a of cassette holder 1 is flat and devoid of a step. Other parts of the tape recorder of FIG. 14 are substantially the same as those of the first embodiment previously described and, accordingly, a further description thereof will be omitted.

The tape recorder according to the second embodiment operates as follows. when the tape recorder is used with a DCC 31 (FIG. 7), the DCC is manually inserted into the cassette holder 1 until it is latched on the slide member 7 in the same manner as occurs in the first embodiment. In this instance, circular flange 55 at the free end of the arm 13 is held in contact with the straight guide surface 51 of control plate 50 so that actuating pin 15 is held in a position outside cassette holder 1. Motor 58 is then driven to turn the lever 57 counterclockwise (FIG. 14) to move slide member 7 from the solid-line first position to the phantom-line second position. Thus, DCC 31 is fully received in cassette holder 1. Control plate 50 is integral with slide member 7 and hence moves together with the slide member.

As control plate 50 advances with slide member 7, circular flange 55 of arm 13 moves from the straight guide surface 51 to the sloped guide surface 52 of control plate 50, whereupon the arm starts turning in the clockwise direction by the force of spring 19. With this pivotal movement of arm 13, the actuating pin 15 of the arm is urged into cassette holder 1. Then the actuating pin 15 starts moving along the arcuate guide edge 56a of the cutout guide recess 56 of upper plate 1a. When arm 13 turns through a certain angular distance, the actuating pin 15 engages front edge 31a (FIG. 16) of DCC 31 and then moves into cutout recess 34 of the DCC. As slide member 7 further advances, actuating pin 15 slides along the sloped guide surface 34a of cutout recess 34 and abuts on the forward end 32a of the slide shutter 32. In this instance, since a further advancing movement of slide shutter 32 is prohibited by actuating pin 15, the body of DCC 31 moves further into the cassette holder 1. As a result, slide shutter 32 is progressively opened by actuating pin 15 as the DCC 31 advances together with the slide member 7. When DCC 31 is fully received in cassette holder 1, the actuating pin 15 is received in a locking groove 34b of the cutout recess 34. In this condition, the slide shutter is fully opened.

Figure 15:
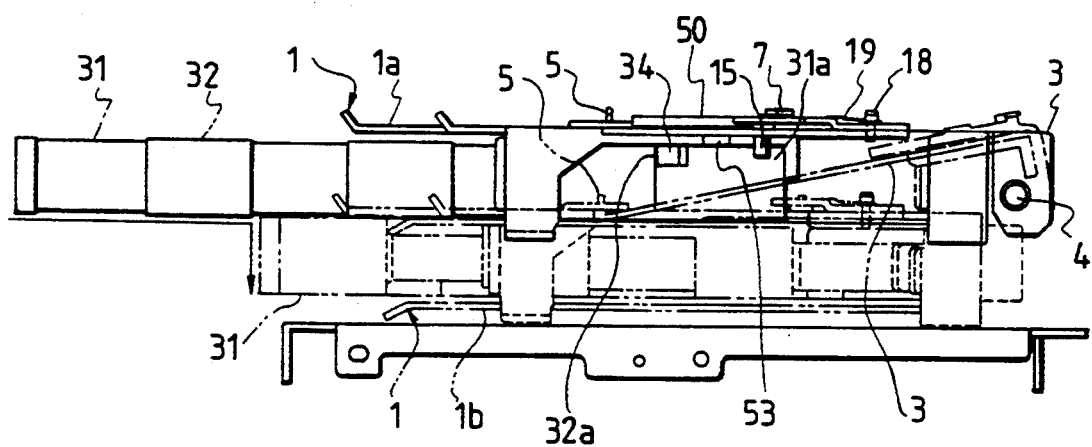
FIG. 15 is a side view of FIG. 14, depicting a vertical movement of a cassette holder of the tape recorder.

Cassette-holder shift member 3 then tilts down (FIG. 17), thereby lowering cassette holder 1 to a lower, loading position indicated by the phantom lines in FIG. 15.

During the movement of the slide member from the first to second position, as long as the engagement between the control plate 50 and arm 13 continues, the guide edge 54 of the upper plate 1a is held between the guide fin 53 and the control plate. The control plate 50 is substantially prevented from moving in a direction parallel to an axis of actuating pin 15. As a result, the cam portion 51 of the control plate 50 is kept in the same plane as the circular flange 55 of arm 13. This arrangement makes it possible to reduce the thickness of the control plate 50 and the arm 13.

Figure 18:
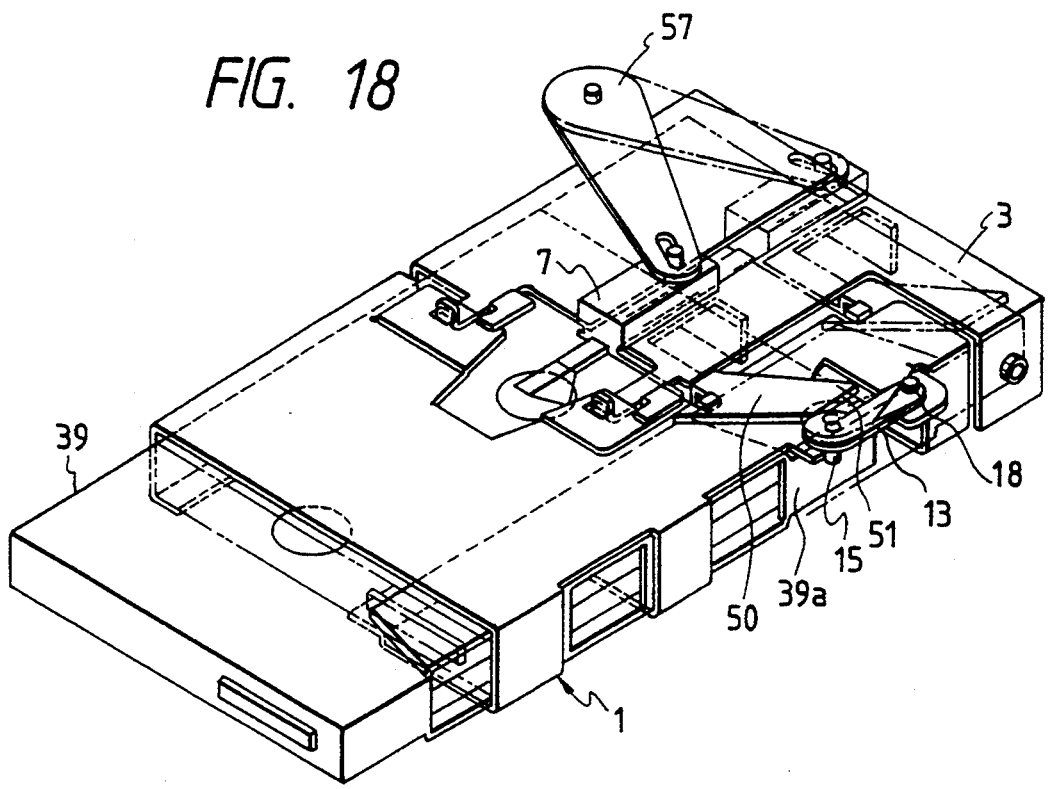
FIG. 18 is a view similar to FIG. 16, in which an ACC is received in the cassette holder.

When an ACC 39 (FIG. 11) is used with the tape recorder, the ACC 39 is manually forced into cassette-holder 1 until it is latched on slide member 7 (FIG. 18). In this instance, actuating pin 15 of arm 13 is held outside cassette holder 1 by means of control plate 50, so that the manual insertion of the ACC 39 is smoothly performed. Slide member 7 is then displaced from the solid-line first position to the phantom-line second position. As control plate 50 moves together with slide member 7, arm 13 turns in the clockwise direction and urges actuating pin 15 into cassette holder 1. The clockwise motion of arm 13 is stopped when the actuating pin 15 abuts on the front edge 39a of the ACC 39, as indicated by the phantom lines in FIG. 18. Since the front edge 39a of ACC 39 is not recessed, actuating pin 18 slides along the front edge as the ACC is advanced by slide member 7. Thus, the shutter opening mechanism does not obstruct the loading of the ACC 39.

Figure 19:
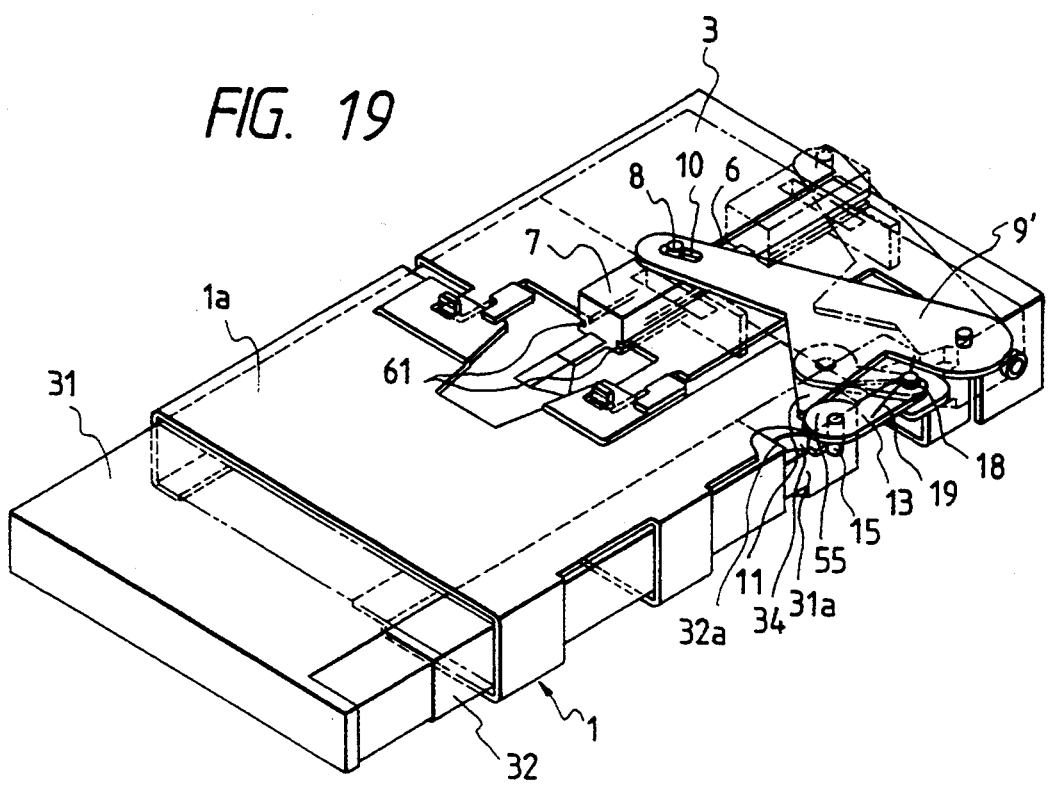
FIG. 19 is a perspective view of a tap recorder according to a third embodiment of the present invention.
Figure 20:
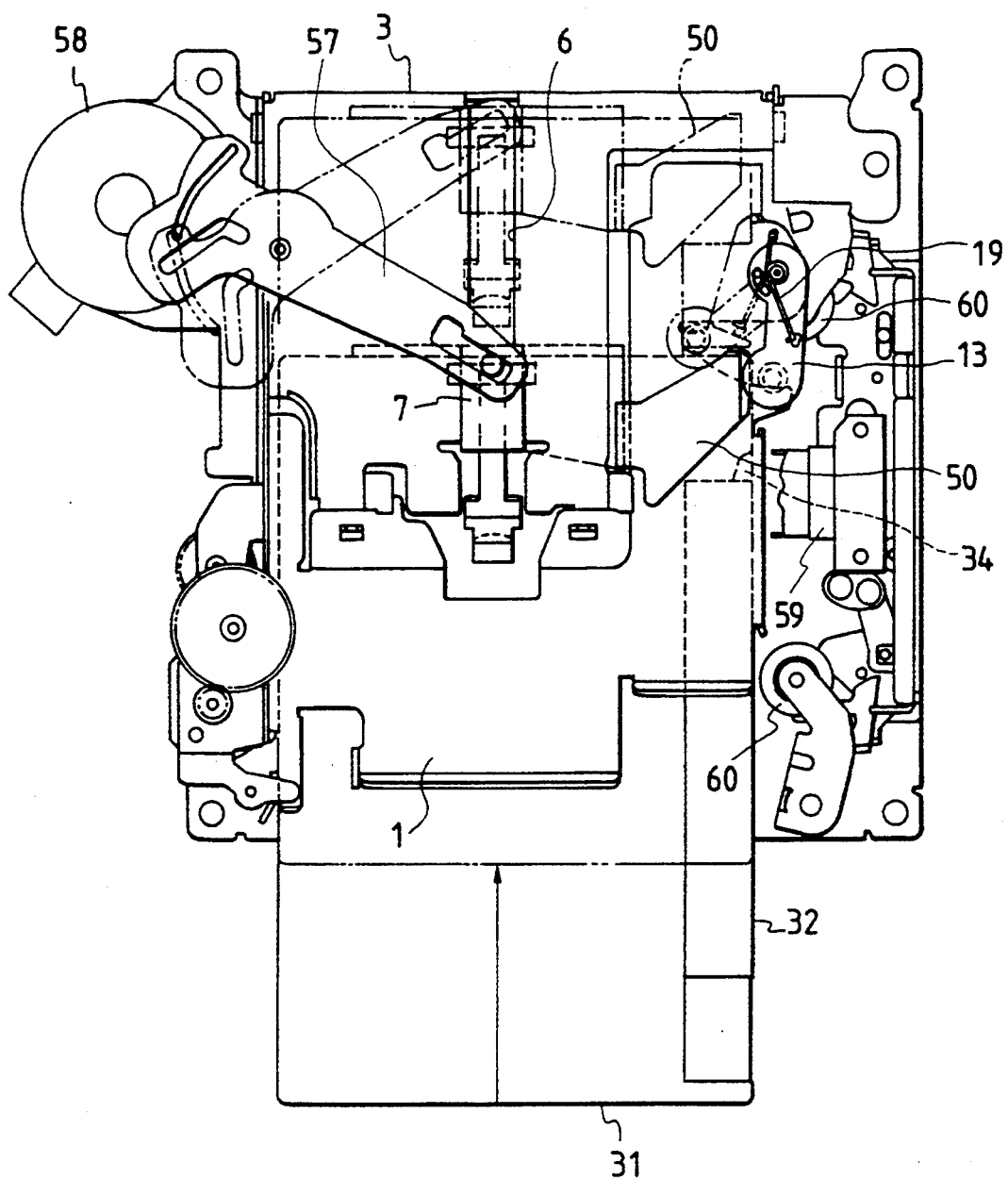
FIG. 20 is a plan view of a tape recorder according to a fourth embodiment of the present invention, the view depicting the tape recorder used with a DCC.

A third embodiment of this invention as depicted in FIG. 19 is substantially the same as the second embodiment described above in conjunction with FIGS. 14–18, with the exception that the control means for controlling the operation of arm 13 is composed of an L-shaped lever 9' instead of the control arm 50. A cam portion 11 which is formed at a free end of L-shaped lever 9' is engageable with the circular flange 55 formed at a free end of the arm 13. Since the L-shaped lever 9 of the first embodiment depicted in FIGS. 1–13, and since other parts are identical to those of the second embodiment described above, operation of this embodiment is believed to be readily understood by one skilled in the art from a reading of the foregoing description of the first and second embodiments.

A fourth embodiment as depicted in FIGS. 20–24 relates to a modification of the second embodiment depicted in FIGS. 14–18 and has various advantageous features incorporated therein to improve the impact resistance of the tape recorder according to the second embodiment. A description will now be given of the differences between the second and fourth embodiments.

Figure 21:
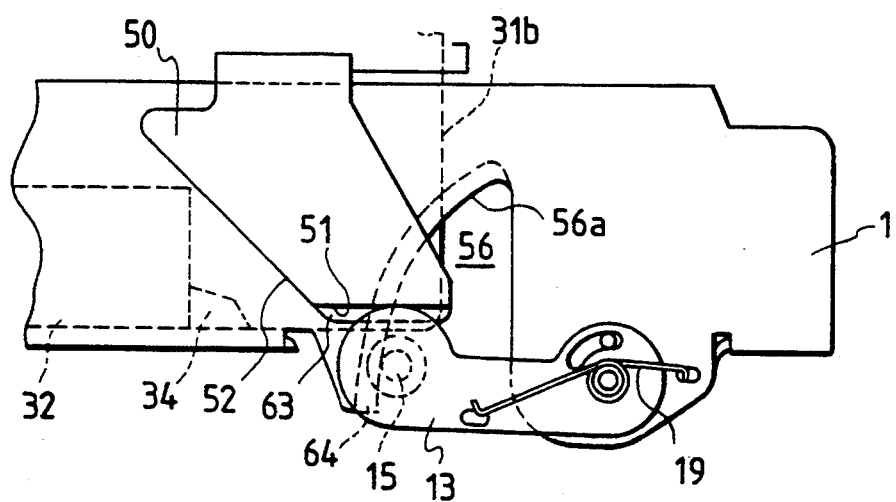
FIG. 21 is an enlarged plan view of a shutter opening mechanism and related parts of the tape recorder depicted in FIG. 20.
Figure 22:
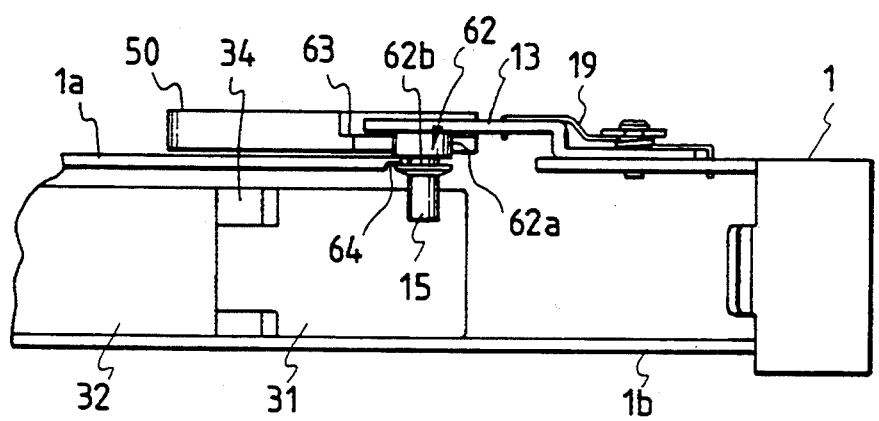
FIG. 22 is a front elevational view of the mechanism and recorder of FIG. 21.
Figure 23:
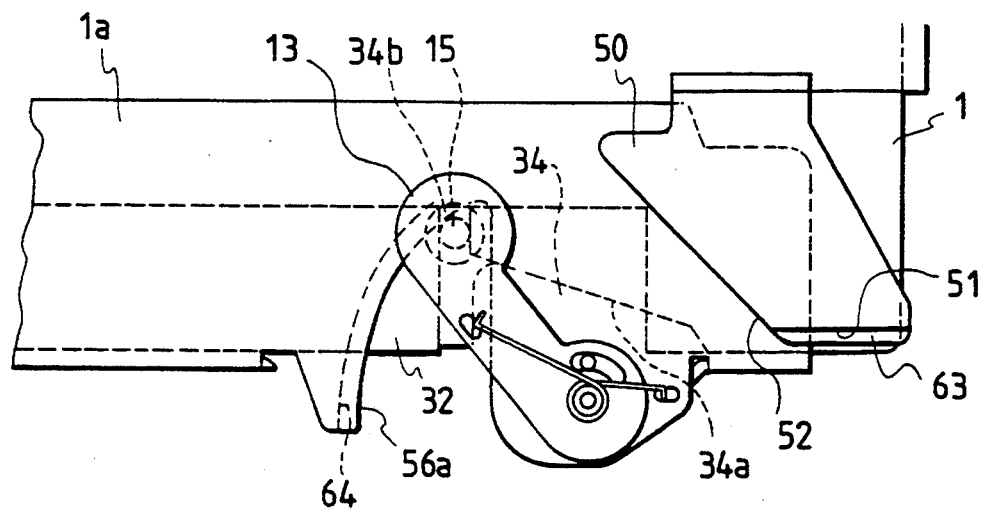
FIG. 23 is a view similar to FIG. 20, in which a slide shutter of the DCC is fully opened by the shutter opening mechanism.

In FIG. 22, arm 13 includes a first motion limiting means 62 formed on the actuating pin 15 for limiting relative movement between the actuating pin and upper plate la of cassette holder 1 in a direction parallel to an axis of the actuating pin. First motion limiting means 62 comprises an enlarged base portion 62a of the actuating pin 15 and an annular flange 62b of the actuating pin. The flange 62b is spaced from the enlarged base portion 62a by a distance slightly larger than the thickness of a portion of the upper plate adjacent the cutout guide recess 56 (FIG. 21). Thus, the arcuate guide edge 56a of the cutout guide recess 56 is slidably received between the enlarged base portion 62a and the flange 62b of the actuating pin 15. With the first motion limiting means 62 thus provided, actuating pin 15 is held in contact with the arcuate guide edge 56a even when the arm 13 is subjected to sever shock or vibration which may be produced when the tape recorder is installed in a motorcar.

In addition, at least one of the arm 13 and the control plate 50 includes a second motion limiting means 63 for limiting relative movement between the arm and the control plate in a direction parallel to an axis of the actuating pin 15. In the illustrated embodiment, the second motion limiting means 63 comprises a step formed at the free end of control plate 50. Step 63 includes the cam portion in the form of the straight guide surface 51. The step 63 supports thereon the circular flange 55 of arm 13 when the arm is disposed in the standby position (FIG. 21). In this instances, the stepped free end of the control plate 50 is held between the circular flange 55 and a portion of the upper plate 1a adjacent the cutout guide recess 56. With this arrangement, the arm 13 and the control plate 50 are protected from accidental separation which would otherwise occur when the tape recorder is subjected to severe shock or vibrations. Though not shown, the second motion limiting means 63 may be formed on the arm 13 in which instance the diameter of the circular flange 55 and the diameter and height of the enlarged base portion 61a are enlarged to such an extent that the enlarged base portion is engageable with the free end (cam portion 51) of the control plate 50 and the circular flange extends over the free end of the control plate.

Figure 24:
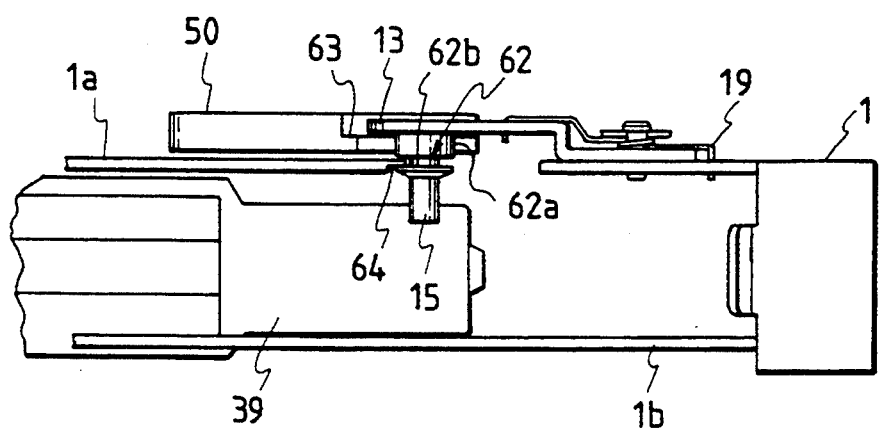
FIG. 24 is a view similar to FIG. 22, in which an ACC is received in a cassette holder of the tape recorder.

As further depicted in FIGS. 22 and 24, the cassette holder 1 has a recess or groove 64 formed in the under surface of upper plate 1a which extends along the arcuate guide edge 56a of the cutout guide recess 56 for receiving a peripheral portion of the flange 62b. The recess 65 has a depth which is at least equal to the thickness of flange 62b. With recess 65 thus provided, flange 62b does not project from the under surface of the upper plate 1a and hence is protected from being trapped between the inside surface of the cassette holder 1 and the outside surface of the ACC 39.

Obviously, various minor changes and modifications of the present invention are possible in the light of the above teaching. It is therefore to be understood that within the scope of the appended claims the invention may be practiced otherwise than as specifically described.

What is claimed is:

1. A tape recorder for use with a tape cassette having a slide shutter movable in a direction parallel to the direction of insertion of the tape cassette relative to the tape recorder for opening and closing a front opening of the tape cassette into which a magnetic head of the tape recorder is movable, said tape recorder comprising:
    (a) a cassette holder for holding therein the tape cassette while preventing the tape cassette from moving at least in a direction perpendicular to the direction of insertion of the tape cassette;
    (b) shutter opening means for opening the slide shutter of the tape cassette received in said cassette holder, said shutter opening means including an actuating pin engageable with an end of the slide shutter, and means for urging said actuating pin into said cassette holder;
    (c) cassette transfer means movable between a first position in which the tape cassette manually inserted in said cassette holder is latched on said transfer means, and a second position in which the tape cassette is fully received in said cassette holder and held in a condition ready for recording and/or playback of the tape cassette, said cassette transfer means being normally disposed in said first position; and
    (d) control means, operatively connected with said cassette transfer means and engageable with said shutter opening means, for controlling the operation of said actuating pin such that when said cassette transfer means is disposed in said first position, said actuating pin is held in a standby position located on the outside of said cassette holder against the force of said urging means, and when said cassette transfer means moves from said first position toward said second position, said actuating pin is able to move into said cassette holder under the force of said urging means and then engage and open the slide shutter of the taper cassette as the tape cassette is advanced by said cassette transfer means, wherein said cassette transfer means includes a fixed pin, and said control means includes a lever pivotally mounted on said cassette holder and having one end and an opposite end remote from said one end, said lever having an oblong hole formed in said one end and slidably receiving therein said fixed pin, and a cam portion formed at said opposite end and engageable with a portion of said shutter opening means for controlling the operation of said shutter opening means.

2. A tape recorder for use with a tape cassette having a slide shutter movable in a direction parallel to the direction of insertion of the tape cassette relative to the tape recorder for opening and closing a front opening of the tape cassette into which a magnetic head of the tape recorder is movable, said tape recorder comprising:

(a) a cassette holder for holding therein the tape cassette while preventing the tape cassette from moving at least in a direction perpendicular to the direction of insertion of the tape cassette;

(b) shutter opening means for opening the slide shutter of the tape cassette received in said cassette holder, said shutter opening means including an actuating pin engageable with an end of the slide shutter, and means for urging said actuating pin into said cassette holder;

(c) cassette transfer means movable between a first position in which the tape cassette manually inserted in said cassette holder is latched on said transfer means, and a second position in which the tape cassette is fully received in said cassette holder and held in a condition ready for recording and/or playback of the tape cassette, said cassette transfer means being normally disposed in said first position; and (d) control means, operatively connected with said cassette transfer means and engageable with said shutter opening means, for controlling the operation of said actuating pin such that when said cassette transfer means is disposed in said first position, said actuating pin is held in a standby position located on the outside of said cassette holder against the force of said urging means, and when said cassette transfer means moves from said first position toward said second position, said actuating pin is able to move into said cassette holder under the force of said urging means and then engage and open the slide shutter of the taper cassette as the tape cassette is advanced by said cassette transfer means, further including a pivotally movable, cassette-holder shift member operatively connected with said cassette holder for moving said cassette holder in a direction perpendicular to a general plane of the cassette tape, wherein said cassette holder includes an upper plate and a lower plate for holding an upper surface and a lower surface, respectively, of the tape cassette received within said cassette holder, said cassette-holder shift member is hinged to said upper plate of said cassette holder, said shutter opening means is pivotally mounted on said cassette holder, said cassette transfer means is slidably mounted on said cassette-holder shift member, and said control means is pivotally mounted on said cassette-holder shift member.

3. A tape recorder according to claim 2, wherein said cassette-holder shift member is a plate-like member having an elongated guide hole extending in a direction parallel to the direction of insertion of the tape cassette, and said cassette transfer means comprises a slide member slidably mounted in said elongated guide hole.

4. A tape recorder according to claim 3, wherein said slide member includes an elongated body slidably received in said elongated guide hole, and a pair of guide wings projecting laterally outwardly from said elongated body and respectively overlying and underlying 6aid like, cassette-holder shift member.

5. A tape recorder according to claim 3, wherein said slide member has two guide grooves slidably fitted with opposite longitudinal edges of said guide hole.

6. A tape recorder according to claim 2, wherein said shutter opening means includes an arm pivotally mounted on said cassette holder and movable in a plane extending parallel to and lying immediately below said upper plate of said cassette holder, said actuating pin extending downwardly from a free end of said arm.

7. A tape recorder according to claim 6, wherein said arm has an overlapping portion for limiting a movement of said arm in a direction perpendicular to a plane of said upper plate, said overlapping portion being disposed within said cassette holder and extending immediately below said upper plate of said cassette holder when said actuating pin is disposed in said standby position, said overlapping portion being arranged to overlap a surface of the tape cassette when received in the cassette holder.

8. A tape recorder according to claim 7, wherein said cassette holder has an opening from which the tape cassette is inserted into said cassette holder, and said free end of said arm has a guide surface contiguous to said overlapping portion and flaring toward said opening of said cassette holder.

9. A tape recorder according to claim 2, wherein said shutter opening means includes an arm pivotally mounted on said cassette holder and movable in a plane extending parallel to and lying immediately above said upper plate of said cassette holder, said actuating pin extending downwardly from a free end of said arm.

10. A tape recorder according to claim 9, wherein said free end of said arm has a circular flange engageable with said control means, said circular flange partly overlying said upper plate of said cassette holder when said actuating pin is disposed in said standby position.

11. A tape recorder according to claim 9, wherein said upper plate of said cassette holder has a cutout guide recess receptive of said actuating pin when said actuating pin protects into said cassette holder, said cutout guide recess having an arcuate guide edge slidably engageable with said actuating pin.

12. A tape recorder according to claim 2, wherein said cassette transfer means includes a first fixed pin, said shutter opening means includes a second fixed pin, and said control means includes a lever pivotally mounted on said cassette-holder shift member and having one and an opposite end remote from said one end, said lever having an oblong hole formed in said one end and slidably receiving therein said first fixed pin, and a cam portion formed at said opposite end and engageable with said second fixed pin for controlling the operation of said shutter opening means.

13. A tape recorder for use with a tape cassette having a slide shutter movable in a direction parallel to the direction of insertion of the tape cassette relative to the tape recorder for opening and closing a front opening of the tape cassette into which a magnetic head of the tape recorder is movable, said tape recorder comprising:

(a) a cassette holder for holding therein the tape cassette while preventing the tape cassette from moving at least in a direction perpendicular to the direction of insertion of the tape cassette;

(b) shutter opening means for opening the slide shutter of the tape cassette received in said cassette holder, said shutter opening means including an actuating pin engageable with an end of the slide shutter, and means for urging said actuating pin into said cassette holder;

(c) cassette transfer means movable between a first position in which the tape cassette manually inserted in said cassette holder is latched on said transfer means, and a second position in which the tape cassette is fully received in said cassette holder and held in a condition ready for recording and/or playback of the tape cassette, said cassette transfer means being normally disposed in said first position; and (d) control means, operatively connected with said cassette transfer means and engageable with said shutter opening means, for controlling the operation of said actuating pin such that when said cassette transfer means is disposed in said first position, said actuating pin is held in a standby position located on the outside of said cassette holder against the force of said urging means, and when said cassette transfer means moves from said first position toward said second position, said actuating pin is able to move into said cassette holder under the force of said urging means and then engage and open the slide shutter of the taper cassette as the tape cassette is advanced by said cassette transfer means, further including a pivotally movable, cassette-holder shift member operatively connected with said cassette holder for moving said cassette holder in a direction perpendicular to a general plane of the cassette tape, wherein said cassette holder includes an upper plate and a lower plate for holding an upper surface and a lower surface, respectively, of the tape cassette received within said cassette holder, said cassette-holder shift member is hinged to said upper plate of said cassette holder, said shutter opening means is pivotally mounted on said cassette holder, said cassette transfer means is slidably mounted on said cassette-holder shift member, and said control means is fixedly connected with said cassette transfer means and movable together with said cassette transfer means.

14. A tape recorder according to claim 13, wherein said cassette-holder shift member is a plate-like member having an elongated guide hole extending In a direction parallel to the direction of insertion of the tape cassette, and said cassette transfer means comprises a slide member slidably mounted in said elongated guide hole.

15. A tape recorder according to claim 14, wherein said slide member has to guide-grooves slidably fitted with opposite longitudinal edges of said guide hole.

16. A tape recorder according to claim 13, wherein said control means includes an elongate control plate fixedly connected at one end with said cassette transfer means and extending over said upper plate of said cassette holder, said control plate having a cam portion at an opposite end remote from said one end, said cam portion being engageable with a portion of said shutter opening means for controlling the operation of said shutter opening means.

17. A tape recorder according to claim 16, wherein said cam portion includes a straight guide surface extending in a direction parallel to the direction of insertion of the tape cassette, said control plate further having a sloped guide surface contiguous to said straight guide surface and facing toward said opening of said cassette holder.

18. A tape recorder according to claim 17, wherein said shutter opening means includes an arm pivotally mounted on said cassette holder and movable in a plane extending parallel to and lying immediately above said upper plate of said cassette holder, said actuating pin extending downwardly from a free end of said arm.

19. A tape recorder according to claim 18, wherein said free end of said arm has a circular flange engageable with said straight guide surface and said eloped guide surface, said circular flange partly overlying said upper plate of said cassette holder when said actuating pin is disposed in said standby position.

20. A tape recorder according to claim 17, wherein said upper plate of said cassette holder has a cutout guide recess receptive of said actuating pin when said actuating pin projects into said cassette holder, said cutout guide recess having an arcuate guide edge slidably engageable with said actuating pin.

21. A tape recorder according to claim 13, wherein said upper plate of said cassette holder has a guide edge extending in a direction parallel to the direction of insertion of the tape cassette, and said control means includes a guide member engageable with said guide edge of said upper plate except when said cassette holder is displaced by said cassette-holder shift member.

22. A tape recorder according to claim 21, wherein said control means is an elongate control plate fixed at one end with said cassette transfer means and extending over said upper plate of said cassette holder, said control plate including a guide fin extending blow said upper plate, said guide fin and said control plate slidably receiving therebetween said guide edge of said upper plate.

* * * * *